(12) United States Patent
Tu et al.

(10) Patent No.: US 10,114,749 B2
(45) Date of Patent: Oct. 30, 2018

(54) CACHE MEMORY SYSTEM AND METHOD FOR ACCESSING CACHE LINE

(71) Applicant: Huawei Technologies Co., Ltd., Shenzhen (CN)

(72) Inventors: Zhenxi Tu, Shenzhen (CN); Jing Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/606,428

(22) Filed: May 26, 2017

(65) Prior Publication Data

US 2017/0262372 A1 Sep. 14, 2017

Related U.S. Application Data

(63) Continuation of application No. PCT/CN2015/095795, filed on Nov. 27, 2015.

(30) Foreign Application Priority Data

Nov. 27, 2014 (CN) .............................. 2014 1 070599

(51) Int. Cl.
*G06F 12/0846* (2016.01)
*G06F 12/0811* (2016.01)
(Continued)

(52) U.S. Cl.
CPC ........ *G06F 12/0846* (2013.01); *G06F 12/084* (2013.01); *G06F 12/0811* (2013.01);
(Continued)

(58) Field of Classification Search
CPC ............. G06F 12/0846; G06F 12/0811; G06F 12/0831; G06F 12/084
See application file for complete search history.

(56) References Cited

U.S. PATENT DOCUMENTS 7,277,992 B2 * 10/2007 Shannon ............. G06F 12/0811
711/119
7,552,288 B2 6/2009 Iyer et al.
(Continued)

FOREIGN PATENT DOCUMENTS

CN 101149706 A 3/2008
CN 101576927 A 11/2009
(Continued)

OTHER PUBLICATIONS

Machine Translation and Abstract of Chinese Publication No. CN101576927, Nov. 11, 2009, 5 pages.
(Continued)

*Primary Examiner* — Jared I Rutz
*Assistant Examiner* — Khoa D Doan
(74) *Attorney, Agent, or Firm* — Conley Rose, P.C.

(57) ABSTRACT

A cache memory system is provided. The cache memory system includes multiple upper level caches and a current level cache. Each upper level cache includes multiple cache lines. The current level cache includes an exclusive tag random access memory (Exclusive Tag RAM) and an inclusive tag random access memory (Inclusive Tag RAM). The Exclusive Tag RAM is configured to preferentially store an index address of a cache line that is in each upper level cache and whose status is unique dirty (UD). The Inclusive Tag RAM is configured to store an index address of a cache line that is in each upper level cache and whose status is unique clean (UC), shared clean (SC), or shared dirty (SD).

14 Claims, 4 Drawing Sheets

(51) Int. Cl.
*G06F 12/0831* (2016.01)
*G06F 12/084* (2016.01)

(52) U.S. Cl.
CPC .... *G06F 12/0831* (2013.01); *G06F 2212/283* (2013.01); *G06F 2212/314* (2013.01)

(56) References Cited

U.S. PATENT DOCUMENTS

| | | | |
|---|---|---|---|
| 7,861,055 B2 | 12/2010 | Pong | |
| 9,058,272 B1* | 6/2015 | O'Bleness | G06F 12/0831 |
| 2002/0069326 A1* | 6/2002 | Richardson | G06F 12/0859 |
| | | | 711/122 |
| 2007/0239938 A1* | 10/2007 | Pong | G06F 12/0846 |
| | | | 711/122 |
| 2008/0071994 A1 | 3/2008 | Fields et al. | |
| 2013/0042070 A1 | 2/2013 | Jalal et al. | |
| 2013/0318308 A1* | 11/2013 | Jayasimha | G06F 12/0833 |
| | | | 711/146 |
| 2018/0157590 A1* | 6/2018 | Persson | G06F 12/0833 |

FOREIGN PATENT DOCUMENTS

| | | |
|---|---|---|
| CN | 102591800 A | 7/2012 |
| CN | 102789483 A | 11/2012 |
| CN | 103885890 A | 6/2014 |
| CN | 104679669 A | 6/2015 |

OTHER PUBLICATIONS

Machine Translation and Abstract of Chinese Publication No. CN102591800, Jul. 18, 2012, 6 pages.
Machine Translation and Abstract of Chinese Publication No. CN102789483, Nov. 21, 2012, 22 pages.
Machine Translation and Abstract of Chinese Publication No. CN103885890, Jun. 25, 2014, 15 pages.
Machine Translation and Abstract of Chinese Publication No. CN104679669, Jun. 3, 2015, 17 pages.
Gupta, S., et al., Adaptive Cache Bypassing for Inclusive Last Level Caches, 27th International Symposium on Parallel & Distributed Processing, May 20-24, 2013, 11 pages.
"ARM AMBA 5 CHI Architecture Specification," 2014, 272 pages.
Gaur, J., et al., "Bypass and Insertion Algorithms for Exclusive Last-level Caches," ISCA, Jun. 4-8, 2011, 12 pages.
Foreign Communication From a Counterpart Application, Chinese Application No. 201410705991.3, Chinese Search Report dated Mar. 24, 2017, 2 pages.
Foreign Communication From a Counterpart Application, Chinese Application No. 201410705991.3, Chinese Office Action dated Apr. 1, 2017, 7 pages.
Foreign Communication From a Counterpart Application, PCT Application No. PCT/CN2015/095795 English Translation of International Search Report dated Mar. 2, 2016, 2 pages.
Foreign Communication From a Counterpart Application, PCT Application No. PCT/CN2015/095795 English Translation of Written Opinion dated Mar. 2, 2016, 7 pages.

* cited by examiner

CACHE MEMORY SYSTEM AND METHOD FOR ACCESSING CACHE LINE

CROSS-REFERENCE TO RELATED APPLICATIONS

This application is a continuation of International Application No. PCT/CN2015/095795, filed on Nov. 27, 2015, which claims priority to Chinese Patent Application No. 201410705991.3, filed on Nov. 27, 2014, both of which are hereby incorporated by reference in their entireties.

TECHNICAL FIELD

The present disclosure relates to computer technologies, and in particular, to a cache memory system and a method for accessing a cache line in the cache memory system.

BACKGROUND

A central processing unit (CPU) needs to read data from a main memory during an operation, and because a read/write speed of the main memory is much less than an operating speed of the CPU, a processing capability of the CPU cannot be made full use of To mitigate a conflict that the operating speed of the CPU does not match the read/write speed of the main memory, a cache memory is generally disposed between the CPU and the main memory.

Data exchange between the cache memory and the main memory is performed in a unit of a cache line, where the cache line may also be referred to as a cache block. When reading data or an instruction, the CPU stores the data or instruction obtained by reading into a cache line. When the CPU needs to read the same or similar data for the second time, the CPU may obtain the data from the corresponding cache line. Because a speed at which the CPU accesses a cache is much greater than a speed at which the main memory is accessed, overall system performance is greatly improved.

The cache memory includes a tag random access memory (Tag RAM) and a data random access memory (Data RAM). The Tag RAM is configured to store an index address of a cache line in a cache, and the Data RAM is configured to store data of the cache line in the cache. A workflow in which the CPU accesses a cache is first accessing the Tag RAM to determine whether a cache line is in the cache; and if hit, directly obtaining data from the Data RAM, or if missed, obtaining data from the main memory.

Coherent Hub Interface (CHI) is a bus interconnection protocol used to connect multiple systems on chip (SoC), and is an extensible network structure. In the CHI protocol, statuses of a cache line are classified into five types, which are an invalid (I) state, a unique clean (UC) state, a unique dirty (UD) state, a shared clean (SC) state, and a shared dirty (SD) state. The I state is used to indicate that no data exists in the cache line. The UC state is used to indicate that the cache line exists only in one cache and the cache line includes clean data, where the clean data means that the data is not modified after being read from the main memory and remains consistent with the data in the main memory. The UD state is used to indicate that the cache line exists only in one cache and the cache line includes dirty data, where the dirty data means that the data is modified after being read from the main memory and is inconsistent with the data in the main memory. The SC state is used to indicate that the cache line exits in multiple caches cache and the cache line includes clean data. The SD state is used to indicate that the cache line exists in multiple caches and the cache line includes dirty data.

Further, the CHI protocol defines operations that a requesting party may perform on a cache line when the cache line is in the foregoing statuses. The requesting party is generally a cache at a specific level. That a cache line in a level 2 (L2) cache is accessed is used as an example, and these operations include the following steps.

(1) When the cache line in the L2 cache is in the I state, data of the cache line in the L2 cache cannot be accessed.

(2) When the cache line in the L2 cache is in the UC state, if the requesting party requests to access the data of the cache line in the L2 cache, the L2 cache may selectively return the data of the cache line to the requesting party, that is, may or may not return the data of the cache line to the requesting party.

(3) When the cache line in the L2 cache is in the UD state, if the requesting party requests to access the data of the cache line in the L2 cache, the L2 cache must return the data of the cache line to the requesting party.

(4) The data of the cache line in the SC or SD state cannot be modified, unless the cache line in the SC or SD state changes into another status, and according to a data consistency principle, data of a cache line in the SC or SD state in a cache at any level is the latest.

In a multi-core communications processing chip, a multi-level cache structure is generally used, that is, caches are classified into multiple levels. Typically, the caches are classified into three levels. FIG. 1 is a schematic structural diagram of three levels of caches. Access speeds of a level 1 cache (L1 cache), a level 2 cache (L2 cache), and a level 3 cache (L3 cache) decrease successively, and their capacities increase successively. The L1 cache includes an L1 cache 1, an L1 cache 2, an L1 cache 3, and an L1 cache 4, which may be separately accessed by four CPUs. The L2 cache includes an L2 cache A and an L2 cache B. The L1 cache is an upper level cache relative to the L2 cache, and the L2 cache is an upper level cache relative to the L3 cache.

In other approaches, multiple levels of caches with an exclusive structural design are provided. A feature of the multiple levels of caches is that there is no intersection between different levels of caches, that is, it is ensured that data of different cache lines is stored in two levels of caches, so as to prevent data of a same cache line from being stored in both the two levels of caches, thereby maximizing a cache capacity. Using the L2 cache and the L3 cache as an example, if data of a cache line is stored in the L2 cache, the data of the cache line is no longer stored in the L3 cache. In the multi-core communications processing chip, it is assumed that data of a cache line is stored in the L2 cache A and the L2 cache B needs to access the data of the cache line; after the L2 cache B sends a request to the L3 cache, because the data of the cache line is not stored in an L3 cache, the L3 cache needs to send a request for accessing the cache line to the L2 cache A, so as to obtain the data of the cache line from the L2 cache A.

However, according to the CHI protocol, the L2 cache A is allowed to skip returning data or return partial data after receiving an access request. For example, when a cache line in the L2 cache A is in the UC state, the L2 cache A may not return data of the cache line to a requesting party after receiving a request for accessing the cache line. Therefore, the L2 cache B needs to read the data of the cache line from the main memory, and a delay caused by reading the data from the main memory is significantly large. Therefore, based on the CHI protocol, a cache memory system with the exclusive structural design reduces cache system performance.

In the other approaches, multiple levels of caches with an inclusive structural design are further provided. A feature of the multiple levels of caches is that data, of all cache lines, stored in an upper level cache is backed up and stored in a lower level cache, so as to ensure that the data, of the cache lines, stored in the upper level cache has a backup in the lower level cache. Likewise, using the L2 cache and the L3 cache as an example, data, of a cache line, stored in the L2 cache is necessarily stored in the L3 cache. In the multi-core communications processing chip, it is assumed that data of a cache line is stored in the L2 cache A and the L2 cache B needs to access the data of the cache line; after the L2 cache B sends a request for accessing the cache line to the L3 cache, if the data of the cache line in the L3 cache is the latest, the cache line is directly read from the L3 cache without a need to read the data of the cache line from the L2 cache A; or if the data of the cache line in the L3 cache is not the latest, a request for accessing the cache line needs to be sent to the L2 cache A, so as to obtain the data of the cache line from the L2 cache A.

According to the CHI protocol, the multiple levels of caches with the inclusive structural design may ensure that the L2 cache B can obtain data of a cache line from the L3 cache if the L2 cache A does not return the data or returns partial data. However, an inclusive structure results in a significant capacity waste, and data, of all cache lines, stored in an upper level cache is also stored in a lower level cache. Especially when a quantity of CPU cores is large, a requirement for a capacity of the lower level cache is extremely high.

SUMMARY

Embodiments of the present disclosure provide a cache memory system and a method for accessing a cache line. A cache memory system with a hybrid RAM structural design can improve performance of the cache memory system.

To achieve the foregoing objective, the following technical solutions are used in the embodiments of the present disclosure.

According to a first aspect, the present disclosure provides a cache memory system, including multiple upper level caches, where each upper level cache includes multiple cache lines; and a current level cache, where the current level cache includes an exclusive tag random access memory (Exclusive Tag RAM) and an inclusive tag random access memory (Inclusive Tag RAM), the Exclusive Tag RAM is configured to preferentially store an index address of a first cache line that is in each upper level cache and whose status is UD, the Inclusive Tag RAM is configured to store an index address of a second cache line that is in each upper level cache and whose status is UC, SC, or SD, and data of the second cache line is backed up and stored in the current level cache.

With reference to the first aspect, in a first possible implementation manner, the multiple upper level caches include a first cache and a second cache, the current level cache includes a Data RAM, and the data of the second cache line is backed up and stored in the Data RAM; the first cache is configured to send a request for accessing a third cache line to the current level cache; and the current level cache is configured to, after receiving the request for accessing the third cache line sent by the first cache, determine that an index address of the third cache line is in the Exclusive Tag RAM or the Inclusive Tag RAM, determine a status of the third cache line, and according to the status of the third cache line, determine to send, to the first cache, data that is of the cache line and that is obtained from the second cache or data that is of the third cache line and that is backed up and stored in the Data RAM of the current level cache.

With reference to the first possible implementation manner of the first aspect, in a second possible implementation manner, the current level cache is configured to send the data that is of the third cache line and that is obtained from the second cache to the first cache when determining that the status of the third cache line is UD; or send the data that is of the third cache line and that is backed up and stored in the Data RAM of the current level cache to the first cache when determining that the status of the third cache line is SC or SD; or send a request for accessing the data of the third cache line to the second cache when determining that the status of the third cache line is UC; and if the data of the third cache line sent by the second cache is received, send the data that is of the third cache line and that is obtained from the second cache to the first cache; or if an indication, sent by the second cache, for skipping sending the data of the third cache line is received, send the data that is of the third cache line and that is backed up and stored in the Data RAM of the current level cache to the first cache.

With reference to the first or the second possible implementation manner of the first aspect, in a third possible implementation manner, the current level cache further includes a status random access memory (Status RAM), and the Status RAM is configured to record a status of a cache line whose index address is in the Exclusive Tag RAM or the Inclusive Tag RAM; and the current level cache is configured to determine the status of the third cache line according to the Status RAM.

With reference to the first aspect and the first, the second, or the third possible implementation manner of the first aspect, in a fourth possible implementation manner, when a size of space, in the Exclusive Tag RAM, occupied by the index address of the first cache line reaches a maximum capacity value of the Exclusive Tag RAM, the Inclusive Tag RAM is further configured to store an index address of a fourth cache line that is in each upper level cache and whose status is UD, where the index address of the fourth cache line cannot be stored in the Exclusive Tag RAM; and data of the fourth cache line is backed up and stored in the current level cache.

With reference to the first aspect and the first, the second, the third, or the fourth possible implementation manner of the first aspect, in a fifth possible implementation manner, the UC state is used to indicate that a cache line in the UC state exists only in one cache of the cache memory system, and the cache line in the UC state includes clean data; the UD state is used to indicate that a cache line in the UD state exists only in one cache of the cache memory system, and the cache line in the UD state includes dirty data; the SC state is used to indicate that a cache line in the SC state exists in multiple caches of the cache memory system, and the cache line in the SC state includes clean data; and the SD state is used to indicate that a cache line in the SD state exists in multiple caches of the cache memory system, and the cache line in the SD state includes dirty data.

With reference to the first aspect and the first, the second, the third, the fourth, or the fifth possible implementation manner of the first aspect, in a sixth possible implementation manner, the upper level cache is a level N cache, and the current level cache is a level N+1 cache, where N is a natural number.

According to a second aspect, the present disclosure provides a method for accessing a cache line in a cache memory system. The cache memory system includes multiple upper level caches and a current level cache. Each upper level cache includes multiple cache lines. The multiple upper level caches include a first cache and a second cache. The current level cache includes an Exclusive Tag RAM and an Inclusive Tag RAM. The Exclusive Tag RAM is configured to preferentially store an index address of a first cache line that is in each upper level cache and whose status is UD. The Inclusive Tag RAM is configured to store an index address of a second cache line that is in each upper level cache and whose status is UC, SC, or SD. Data of the second cache line is backed up and stored in the current level cache. The method for accessing a cache line includes sending, by the first cache, a request for accessing a third cache line to the current level cache; after receiving the request for accessing the third cache line, determining, by the current level cache, that an index address of the third cache line is in the Exclusive Tag RAM or the Inclusive Tag RAM; determining, by the current level cache, a status of the third cache line; and determining, by the current level cache according to the status of the third cache line, to send, to the first cache, data that is of the third cache line and that is obtained from the second cache or data that is of the third cache line and that is backed up and stored in the current level cache.

With reference to the second aspect, in a first possible implementation manner, determining, by the current level cache according to the status of the third cache line, to send, to the first cache, data that is of the third cache line and that is obtained from the second cache or data that is of the third cache line and that is backed up and stored in the current level cache includes sending, by the current level cache, the data that is of the third cache line and that is obtained from the second cache to the first cache when determining that the status of the third cache line is UD; or sending, by the current level cache, the data that is of the third cache line and that is backed up and stored in the current level cache to the first cache when determining that the status of the third cache line is SC or SD; or sending, by the current level cache, a request for accessing the data of the third cache line to the second cache when determining that the status of the third cache line is UC; and if the data of the third cache line sent by the second cache is received, sending, by the current level cache, the data that is of the third cache line and that is obtained from the second cache to the first cache; or if an indication, sent by the second cache, for skipping sending the data of the third cache line is received, sending, by the current level cache, the data that is of the third cache line and that is backed up and stored in the current level cache to the first cache.

With reference to the first possible implementation manner of the first aspect, in a second possible implementation manner, the sending, by the current level cache, the data that is of the third cache line and that is obtained from the second cache to the first cache when determining that the status of the third cache line is UD includes sending, by the current level cache, a request for accessing the data of the third cache line to the second cache; after receiving the request for accessing the data of the third cache line, sending, by the second cache, the data of the third cache line stored in the second cache to the current level cache; and sending, by the current level cache, the received data of the third cache line to the first cache.

With reference to the first aspect and the first or the second possible implementation manner of the first aspect, in a third possible implementation manner, the determining, by the current level cache, a status of the third cache line includes determining, by the current level cache, the status of the third cache line according to a Status RAM of the current level cache, where the Status RAM is configured to record a status of a cache line whose index address is in the Exclusive Tag RAM or the Inclusive Tag RAM.

With reference to the first aspect and the first, the second, or the third possible implementation manner of the first aspect, in a fourth possible implementation manner, the method for accessing a cache line further includes, when the status of the first cache line whose index address is in the Exclusive Tag RAM changes from UD to SC, SD, or UC, backing up and storing data that is of the first cache line and that resides in one cache of the multiple upper level caches into the current level cache, establishing, in the Inclusive Tag RAM, an index address that is of the first cache line and that is in the current level cache, and deleting the index address that is of the first cache line and that is in the Exclusive Tag RAM; and when the status of the second cache line whose index address is in the Inclusive Tag RAM changes from SC, SD, or UC to UD, establishing, in the Exclusive Tag RAM, an index address of the second cache line in the upper level cache, and deleting the data that is of the second cache line and that is backed up and stored in the current level cache and the index address that is of the second cache line and that is in the Inclusive Tag RAM.

With reference to the first aspect and the first, the second, the third, or the fourth possible implementation manner of the first aspect, in a fifth possible implementation manner, the UC state is used to indicate that a cache line in the UC state exists only in one cache of the cache memory system, and the cache line in the UC state includes clean data; the UD state is used to indicate that a cache line in the UD state exists only in one cache of the cache memory system, and the cache line in the UD state includes dirty data; the SC state is used to indicate that a cache line in the SC state exists in multiple caches of the cache memory system, and the cache line in the SC state includes clean data; and the SD state is used to indicate that a cache line in the SD state exists in multiple caches of the cache memory system, and the cache line in the SD state includes dirty data.

With reference to the first aspect and the first, the second, the third, the fourth, or the fifth possible implementation manner of the first aspect, in a sixth possible implementation manner, the upper level cache is a level N cache, and the current level cache is a level N+1 cache, where N is a natural number.

In the cache memory system and the method for accessing a cache line that are provided in the embodiments of the present disclosure, because a hybrid RAM structure is used for a current level cache, that is, the current level cache includes an Exclusive Tag RAM and an Inclusive Tag RAM, and because data of a cache line corresponding to an index address stored in the Exclusive Tag RAM is stored in an upper level cache, the cache memory system with a hybrid RAM structural design can reduce a capacity for storing data of a cache line, compared with a current level cache with a pure Inclusive Tag RAM structural design. In addition, because data of a cache line corresponding to an index address stored in the Inclusive Tag RAM is stored in both the current level cache and the upper level cache, when it is required to access the data of the cache line corresponding to the index address stored in the Inclusive Tag RAM of the current level cache, the data can be obtained from either the current level cache or the upper level cache. Compared with a current level cache with a pure Exclusive Tag RAM structural design, the cache memory system with the hybrid RAM structural design can improve a hit rate of obtaining data of a cache line and reduce a delay caused by reading data of a cache line from a main memory, thereby improving performance of the cache memory system.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

That a cache memory system described in the present disclosure includes two levels of caches is used as an example, where the two levels of caches are multiple upper level caches and a current level cache. The cache memory system is not limited to merely including two levels of caches. The cache memory system provided in the present disclosure may further include other levels of caches so as to form a cache memory system that includes multiple levels, such as a cache memory system with a three-level or four-level structure.

Among cache line statuses described in the present disclosure, a UC state is used to indicate that a cache line in the UC state exists only in one cache in the cache memory system, and the cache line in the UC state includes clean data; a UD state is used to indicate that a cache line in the UD state exists only in one cache in the cache memory system, and the cache line in the UD state includes dirty data; an SC state is used to indicate that a cache line in the SC state exists in multiple caches in the cache memory system, and the cache line in the SC state includes clean data; and an SD state is used to indicate that a cache line in the SD state exists in multiple caches in the cache memory system, and the cache line in the SD state includes dirty data.

For ease of description, the present disclosure distinguishes between different cache lines by their names, which include a first cache line, a second cache line, a third cache line, and a fourth cache line. For specific meanings of the first cache line, the second cache line, the third cache line, and the fourth cache line, reference may be made to description in the following embodiments.

Figure 1:
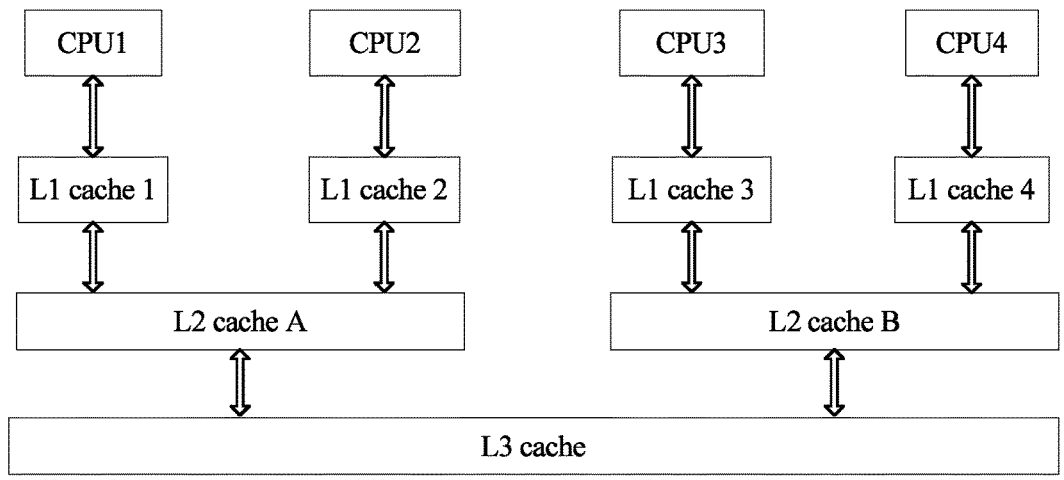
FIG. 1 is a schematic structural diagram of three levels of caches in a multi-core communications processing chip.
Figure 2:
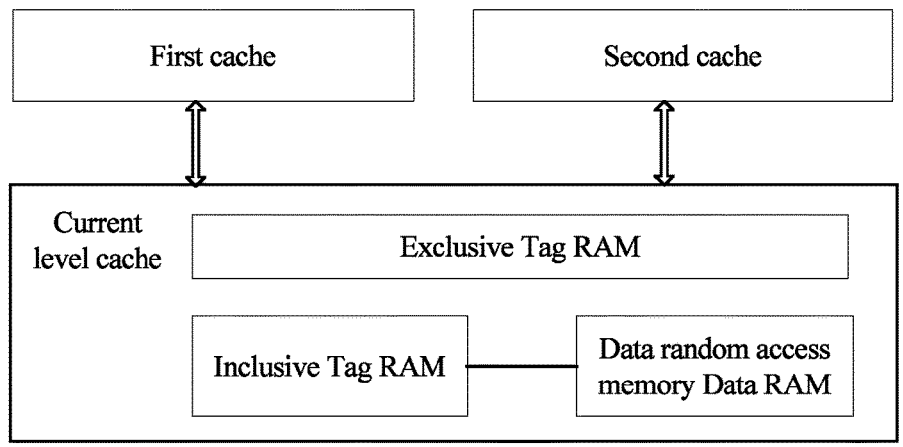
FIG. 2 is a structural diagram of a cache memory system according to an embodiment of the present disclosure.

FIG. 2 describes a cache memory system according to an embodiment of the present disclosure. The cache memory system includes multiple upper level caches and a current level cache, where each upper level cache includes multiple cache lines; and the current level cache includes an Exclusive Tag RAM and an Inclusive Tag RAM; the Exclusive Tag RAM is configured to preferentially store an index address of a first cache line that is in each upper level cache and whose status is UD; the Inclusive Tag RAM is configured to store an index address of a second cache line that is in each upper level cache and whose status is UC, SC, or SD; and data of the second cache line is also backed up and stored in the current level cache.

The current level cache includes the Exclusive Tag RAM, which means that the Exclusive structural design mentioned in the background section is used in the current level cache. Therefore, data of a first cache line whose index address is in the Exclusive Tag RAM is stored in one of the multiple upper level caches, and the data of the first cache line is not backed up and stored in the current level cache. The current level cache further includes the Inclusive Tag RAM, which means that the Inclusive structural design mentioned in the background section is also used in the current level cache. Therefore, data of a second cache line whose index address is in the Inclusive Tag RAM is stored in an upper level cache and also backed up and stored in the current level cache.

As defined in the CHI protocol, when a cache line in an upper level cache is in the UD state, the upper level cache must return data of the cache line if the current level cache requests the data of the cache line from the upper level cache. Therefore, in the cache memory system according to the present disclosure, the Exclusive Tag RAM of the current level cache is configured to preferentially store an index address of a first cache line that is in an upper level cache and whose status is UD, so that when the current level cache requests data of the first cache line in the UD state from the upper level cache, the data that is of the first cache line and that is stored in the upper level cache can be directly obtained according to the index address that is of the first cache line and that is stored in the Exclusive Tag RAM.

Correspondingly, as defined in the CHI protocol, when a cache line in an upper level cache is in the UC state, the upper level cache may or may not return data of the cache line if the current level cache requests the data of the cache line from the upper level cache. Therefore, in the cache memory system according to the present disclosure, an index address of a second cache line that is in an upper level cache and in the UC state is stored in the Inclusive Tag RAM of the current level cache, so as to ensure that data of a cache line in the UC state is stored in the current level cache.

Correspondingly, as defined in the CHI protocol, data of a cache line in the SC or SD state cannot be modified, unless the cache line in the SC or SD state changes into another status, and according to a data consistency principle, data of a cache line in the SC or SD state in a cache at any level is the latest. Therefore, in the cache memory system according to the present disclosure, an index address of a second cache line that is in an upper level cache and in the SC or SD state is stored in the Inclusive Tag RAM of the current level cache, and data of the cache line in the SC or SD state can be directly obtained from the current level cache and does not need to be obtained from the upper level cache.

It should be noted that in the cache memory system, the Exclusive Tag RAM of the current level cache preferentially stores an index address of a cache line that is in each upper level cache and whose status is UD, that is, an index address of a cache line that is in the multiple upper level caches and whose status is UD is first stored in the Exclusive Tag RAM. A cache line whose index address is in the Exclusive Tag RAM is a first cache line, and a status of the first cache line is UD. If a size of space occupied by an index address that is of a first cache line whose status is UD and that is stored in the Exclusive Tag RAM reaches a maximum capacity value of the Exclusive Tag RAM, that is, the Exclusive Tag RAM cannot store any more index address of a cache line whose status is UD, an index address of a fourth cache line whose status is UD may be stored in the Inclusive Tag RAM, where the index address of the fourth cache line cannot be stored in the Exclusive Tag RAM. Therefore, in addition to storing an index address of a second cache line that is in an upper level cache and whose status is UC, SC, or SD, the Inclusive Tag RAM may further store the index address of the fourth cache line whose status is UD, and data of the fourth cache line is backed up and stored in the current level cache.

Further, the multiple upper level caches include a first cache and a second cache, the current level cache further includes a data random access memory Data RAM, and the data of the second cache line is backed up and stored in the Data RAM.

The first cache is configured to send a request for accessing a third cache line to the current level cache, where the third cache line is a to-be-accessed cache line.

The current level cache is configured to, after receiving the request for accessing the third cache line sent by the first cache, determine that an index address of the third cache line is in the Exclusive Tag RAM or the Inclusive Tag RAM, determine a status of the third cache line, and according to the determined status of the third cache line, determine to send, to the first cache, data that is of the third cache line and that is obtained from the second cache or data that is of the third cache line and that is backed up and stored in the Data RAM of the current level cache.

Further, the current level cache further includes a status random access memory Status RAM. The Status RAM is configured to record a status of a cache line whose index address is in the Exclusive Tag RAM or the Inclusive Tag RAM, which means that a status recorded in the Status RAM includes UD, UC, SC, or SD.

The current level cache is configured to determine the status of the third cache line according to the Status RAM, that is, determine the status of the third cache line by querying a status of a cache line recorded in the Status RAM.

Further, the current level cache is configured to send the data that is of the third cache line and that is obtained from the second cache to the first cache when determining that the status of the third cache line is UD; or send the data that is of the third cache line and that is backed up and stored in the Data RAM of the current level cache to the first cache when determining that the status of the third cache line is SC or SD; or send a request for accessing the data of the third cache line to the second cache when determining that the status of the third cache line is UC; and if the data of the third cache line sent by the second cache is received, send the data that is of the third cache line and that is obtained from the second cache to the first cache; or if an indication, sent by the second cache, for skipping sending the data of the third cache line is received, send the data that is of the third cache line and that is backed up and stored in the Data RAM of the current level cache to the first cache.

It should be noted that each upper level cache also includes a Data RAM part, and each upper level cache may also be considered as a current level cache. Data of a cache line stored in a Data RAM in each upper level cache is not further described in the present disclosure.

In the cache memory system provided in this embodiment, because a hybrid RAM structure is used for a current level cache, that is, the current level cache includes an Exclusive Tag RAM and an Inclusive Tag RAM, and because data of a cache line corresponding to an index address stored in the Exclusive Tag RAM is stored in an upper level cache, the cache memory system with a hybrid RAM structural design can reduce a capacity for storing data of a cache line, compared with a current level cache with a pure Inclusive Tag RAM structural design. In addition, because data of a cache line corresponding to an index address stored in the Inclusive Tag RAM is stored in both the current level cache and the upper level cache, when it is required to access the data of the cache line corresponding to the index address stored in the Inclusive Tag RAM of the current level cache, the data can be obtained from either the current level cache or the upper level cache. Compared with a current level cache with a pure Exclusive Tag RAM structural design, the cache memory system with the hybrid RAM structural design can improve a hit rate of obtaining data of a cache line and reduce a delay caused by reading data of a cache line from a main memory, thereby improving performance of the cache memory system.

Figure 3:
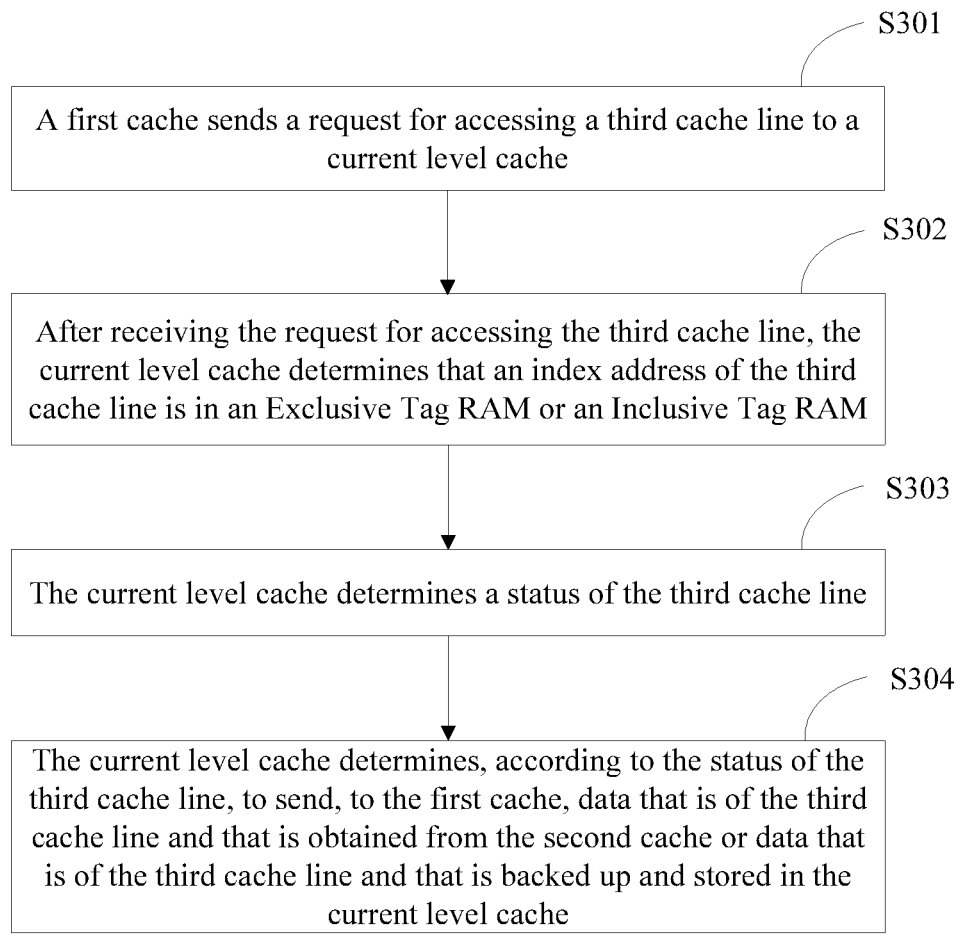
FIG. 3 is a method for accessing a cache line in a cache memory system according to an embodiment of the present disclosure.

FIG. 3 describes a method for accessing a cache line in a cache memory system according to another embodiment of the present disclosure. The method for accessing a cache line is applied to the cache memory system according to the present disclosure. The cache memory system includes multiple upper level caches and a current level cache. Each upper level cache includes multiple cache lines. The multiple upper level caches include a first cache and a second cache. The current level cache includes an Exclusive Tag RAM and an Inclusive Tag RAM. The Exclusive Tag RAM is configured to preferentially store an index address of a first cache line that is in each upper level cache and whose status is UD. The Inclusive Tag RAM is configured to store an index address of a second cache line that is in each upper level cache and whose status is UC, SC, or SD. Data of the second cache line is backed up and stored in the current level cache. For further description of the cache memory system, reference may be made to the cache memory system described in the embodiment corresponding to FIG. 2, and details are not described herein.

The method for accessing a cache line includes the following steps.

S301. The first cache sends a request for accessing a third cache line to the current level cache.

S302. After receiving the request for accessing the third cache line, the current level cache determines that an index address of the third cache line is in the Exclusive Tag RAM or the Inclusive Tag RAM.

The current level cache compares the index address of the third cache line with an index address that is of a cache line and that is recorded in the Exclusive Tag RAM or the Inclusive Tag RAM, so as to determine that the index address of the third cache line is in the Exclusive Tag RAM or the Inclusive Tag RAM.

S303. The current level cache determines a status of the third cache line.

The current level cache of the cache memory system further has a status random access memory Status RAM, and the Status RAM records a status of a cache line whose index address is in the Exclusive Tag RAM or the Inclusive Tag RAM. Therefore, the current level cache may determine the status of the third cache line according to the status of the cache line recorded in the Status RAM.

It should be noted that there is no sequence between a process of determining the status of the third cache line in S303 and a process of determining a Tag RAM in which the index address of the third cache line is located in S302, and the two processes may be performed concurrently.

S304. The current level cache determines, according to the status of the third cache line, to send, to the first cache, data that is of the third cache line and that is obtained from the second cache or data that is of the third cache line and that is backed up and stored in the current level cache.

The following cases A, B, and C describe in detail specific execution processes of the current level cache when the third cache line is in various statuses as follows.

A. The current level cache sends the data that is of the third cache line and that is obtained from the second cache to the first cache when determining that the status of the third cache line is UD.

The current level cache sends a request for accessing the data of the third cache line to the second cache. After receiving the request for accessing the data of the third cache line, the second cache sends the data of the third cache line stored in the second cache to the current level cache. The current level cache sends the received data of the third cache line to the first cache.

It should be noted that according to the description of the embodiment of the cache memory system corresponding to FIG. 2, when a size of space occupied by an index address that is of a first cache line whose status is UD and that is stored in the Exclusive Tag RAM reaches a maximum capacity value of the Exclusive Tag RAM, that is, when the Exclusive Tag RAM cannot store any more index address of a cache line whose status is UD, an index address of a fourth cache line whose status is UD may also be stored in the Inclusive Tag RAM. Therefore, when determining that the status of the third cache line is UD, the index address of the third cache line may be in the Exclusive Tag RAM or may be in the Inclusive Tag RAM. In this case, no matter whether the index address of the third cache line is in the Exclusive Tag RAM or in the Inclusive Tag RAM, the current level cache sends the data that is of the third cache line and that is obtained from the second cache to the first cache.

Figure 4:
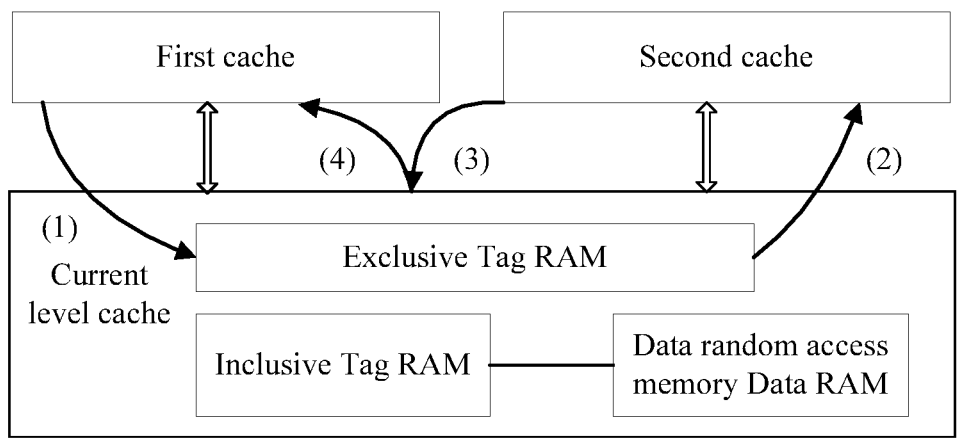
FIG. 4 is an implementation manner for obtaining a to-be-accessed cache line when a status of the to-be-accessed cache line is UD.

FIG. 4 describes a specific process in which the first cache obtains data of the third cache line when the status of the third cache line is UD and the index address of the third cache line is in the Exclusive Tag RAM. In step (1), the first cache sends a request for accessing the third cache line to the current level cache, and the current level cache determines that the index address of the third cache line is in the Exclusive Tag RAM and the status of the third cache line is UD. In step (2), the current level cache sends a request for accessing the data of the third cache line to the second cache. In step (3), after receiving the request for accessing the data of the third cache line, the second cache sends the data of the third cache line stored in the second cache to the current level cache. In step (4), the current level cache sends the received data of the third cache line to the first cache.

Figure 5:
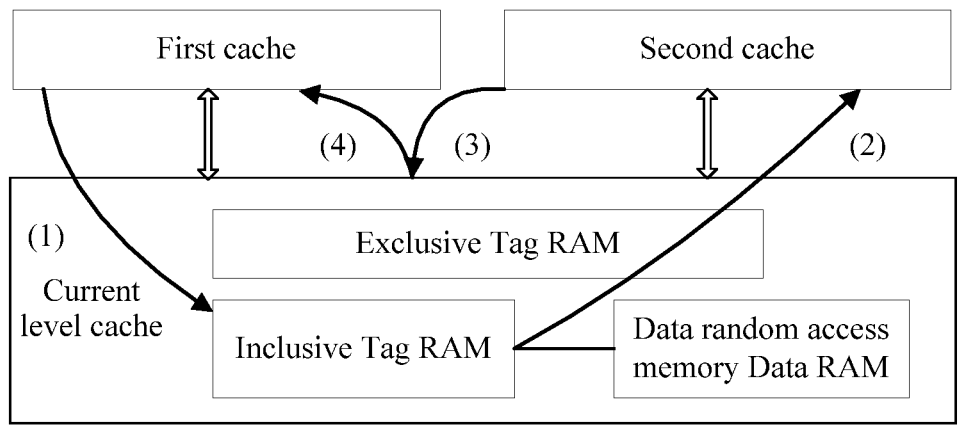
FIG. 5 is another implementation manner for obtaining a to-be-accessed cache line when a status of the to-be-accessed cache line is UD.

FIG. 5 describes a specific process in which the first cache obtains data of the third cache line when the status of the third cache line is UD and the index address of the third cache line is in the Inclusive Tag RAM. In step (1), the first cache sends a request for accessing the third cache line to the current level cache, and the current level cache determines that the index address of the third cache line is in the Inclusive Tag RAM and the status of the third cache line is UD. In step (2), the current level cache sends a request for accessing the data of the third cache line to the second cache. In step (3), after receiving the request for accessing the data of the third cache line, the second cache sends the data of the third cache line stored in the second cache to the current level cache. In step (4), the current level cache sends the received data of the third cache line to the first cache.

B. The current level cache sends the data that is of the third cache line and that is backed up and stored in the current level cache to the first cache when determining that the status of the third cache line is SC or SD.

Data of a second cache line in the SC or SD state is data in a shared state. According to a data consistency principle in the cache memory system, the data of the second cache line in the SC or SD state is consistent in the upper level cache and the current level cache.

Figure 6:
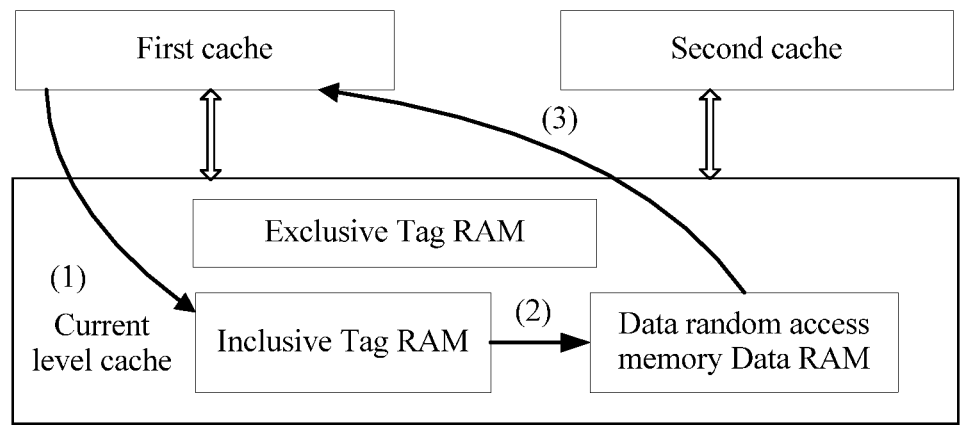
FIG. 6 is an implementation manner for obtaining a to-be-accessed cache line when a status of the to-be-accessed cache line is SC or SD.

Therefore, when the status of the third cache line is SC or SD, the data of the third cache line stored in the current level cache is directly sent to the first cache, and the data of the third cache line does not need to be obtained from the upper level cache. In this case, for a specific process in which the first cache obtains the data of the third cache line, reference may be made to FIG. 6. FIG. 6 describes the specific process in which the first cache obtains data of the third cache line when the status of the third cache line is SC or SD. The index address of the third cache line in the SC or SD state is in the Inclusive Tag RAM. In step (1), the first cache sends a request for accessing the third cache line to the current level cache, and the current level cache determines that the index address of the third cache line is in the Inclusive Tag RAM and the status of the third cache line is SC or SD. In step (2), the current level cache obtains the data of the third cache line from a data random access memory Data RAM of the current level cache using the index address of the third cache line recorded in the Inclusive Tag RAM. In step (3), the current level cache sends the obtained data of the third cache line to the first cache.

C. The current level cache sends a request for accessing the data of the third cache line to the second cache when determining that the status of the third cache line is UC; and if the data of the third cache line sent by the second cache is received, the current level cache sends the data that is of the third cache line and that is obtained from the second cache to the first cache; or if an indication, sent by the second cache, for skipping sending the data of the third cache line is received, the current level cache sends the data that is of the third cache line and that is backed up and stored in the current level cache to the first cache.

Data of a second cache line in the UC state is data in an exclusive state. If the data that is of the second cache line in the UC state and that is in the upper level cache has been modified, the upper level cache does not instruct the current level cache to correspondingly modify the data that is of the second cache line and that is backed up and stored in the current level cache. In this case, the data of the second cache line can be obtained only from the upper level cache. If the data that is of the second cache line in the UC state and that is in the upper level cache is not modified, the data of the second cache line stored in the upper level cache and that stored in the current level cache remain consistent. In this case, the data of the second cache line can be obtained from the current level cache, and the data of the second cache line does not need to be obtained from the upper level cache.

Therefore, when the status of the third cache line is UC, the current level cache cannot directly send the data that is of the third cache line and that is backed up and stored in the current level cache to the first cache. The current level cache needs to send a request for accessing the data of the third cache line to the second cache in the upper level cache, and perform corresponding processing according to a response received from the second cache, which is as follows.

Figure 7:
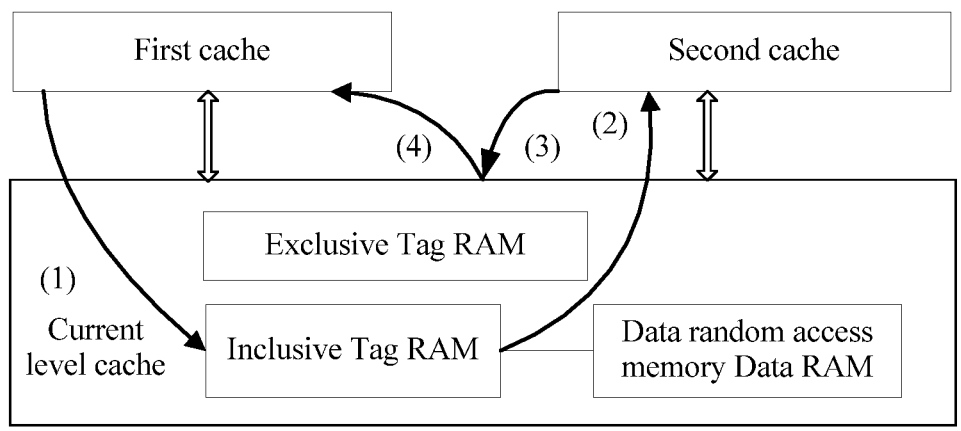
FIG. 7 is an implementation manner for obtaining a to-be-accessed cache line when a status of the to-be-accessed cache line is UC.

If the current level cache receives the data of the third cache line sent by the second cache, which means that the data of the third cache line in the second cache has been modified, the current level cache sends, to the first cache, the data of the third cache line sent by the second cache. In this case, for a specific process in which the first cache obtains the data of the third cache line, reference may be made to FIG. 7. FIG. 7 describes an implementation process in which the first cache obtains data of the third cache line when the status of the third cache line is UC. In step (1), the first cache sends a request for accessing the third cache line to the current level cache, and the current level cache determines that the index address of the third cache line is in the Inclusive Tag RAM and the status of the third cache line is UC. In step (2), the current level cache sends a request for accessing the data of the third cache line to the second cache. In step (3), after receiving the request for accessing the data of the third cache line, the second cache determines that the data of the third cache line in the UC state has been modified, and sends the data of the third cache line to the current level cache. In step (4), the current level cache sends the received data of the third cache line to the first cache.

Figure 8:
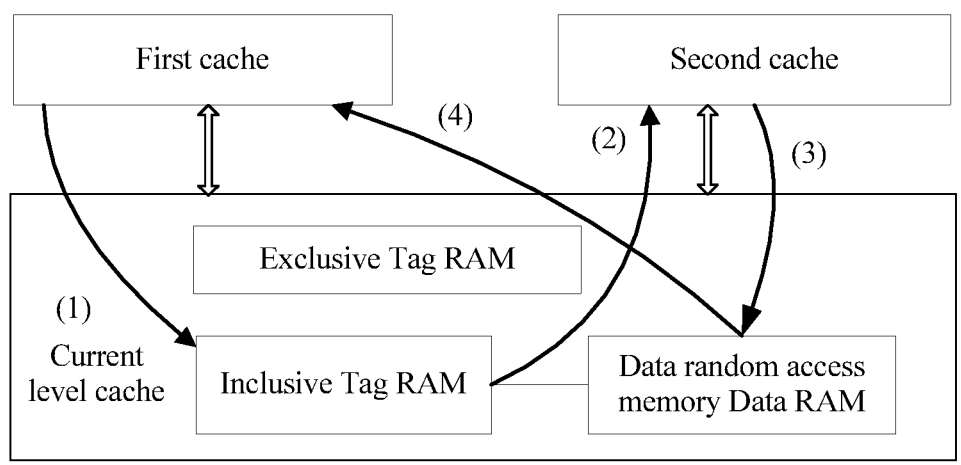
FIG. 8 is another implementation manner for obtaining a to-be-accessed cache line when a status of the to-be-accessed cache line is UC.

Alternatively, if an indication, sent by the second cache, for skipping returning the data of the third cache line is received, which means that the data of the third cache line in the second cache is not modified, the current level cache sends the data of the third cache line stored in the current level cache to the first cache. In this case, for a specific process in which the first cache obtains the data of the third cache line, reference may be made to FIG. 8. FIG. 8 describes another implementation process in which the first cache obtains data of the third cache line when the status of the third cache line is UC. In step (1), the first cache sends a request for accessing the third cache line to the current level cache, and the current level cache determines that the index address of the third cache line is in the Inclusive Tag RAM and the status of the cache line is UC. In step (2), the current level cache sends a request for accessing the data of the third cache line to the second cache. In step (3), after receiving the request for accessing the data of the third cache line, the second cache determines that the data of the third cache line in the UC state is not modified, and sends, to the current level cache, the indication for skipping returning the data of the third cache line. In step (4), after receiving the indication for skipping returning the data of the third cache line, the current level cache sends the data that is of the third cache line and that is backed up and stored in the Data RAM of the current level cache to the first cache.

Further, because a status of a cache line in the cache memory system may change, when the status of the cache line changes, an index address of the cache line needs to be correspondingly transferred between the Exclusive Tag RAM and the inclusive tag RAM. Therefore, the method for accessing a cache line may further include, when the status of the first cache line whose index address is in the Exclusive Tag RAM changes from UD to SC, SD, or UC, backing up and storing data that is of the first cache line and that resides in one cache of the multiple upper level caches into the current level cache, establishing, in the Inclusive Tag RAM, an index address that is of the first cache line and that is in the current level cache, and deleting the index address that is of the first cache line and that is in the Exclusive Tag RAM; and when the status of the second cache line whose index address is in the Inclusive Tag RAM changes from SC, SD, or UC to UD, establishing, in the Exclusive Tag RAM, an index address of the second cache line in the upper level cache, and deleting the data that is of the second cache line and that is backed up and stored in the current level cache and the index address that is of the second cache line and that is in the Inclusive Tag RAM.

It should be noted that the foregoing two transfer manners are specific to a case in which the size of the space occupied by the index address that is of the first cache line whose status is UD and that is stored in the Exclusive Tag RAM does not reach the maximum capacity value of the Exclusive Tag RAM. In this case, an index address of a cache line in the UD state is stored only in the Exclusive Tag RAM, and no index address of a cache line in the UD state is stored in the Inclusive Tag RAM.

When a case in which an index address of a first cache line whose status is UD is stored in the Exclusive Tag RAM and an index address of a fourth cache line whose status is UD is stored in the Inclusive Tag RAM occurs, if a status of a second cache line whose index address is in the Inclusive Tag RAM changes from SC, SD, or UC to UD, it is only required to change the status of the second cache line from SC, SD, or UC to UD in the status random access memory of the current level cache, without a need to modify the index address of the second cache line. If a status of a fourth cache line whose index address is in the Inclusive Tag RAM changes from UD to SC, SD, or UC, it is only required to change the status of the fourth cache line from UD to SC, SD, or UC in the status random access memory of the current level cache, without a need to modify the index address of the fourth cache line.

It should be noted that for ease of description, this embodiment provides only a method for accessing a cache line between an upper level cache and a current level cache. In practice, the method for accessing a cache line according to the present disclosure may be applied between any two adjacent levels of caches in the cache memory system, which is not limited in the present disclosure.

Because a hybrid RAM structure is used for a current level cache, that is, the current level cache includes an Exclusive Tag RAM and an Inclusive Tag RAM, and because data of a cache line corresponding to an index address stored in the Exclusive Tag RAM is stored in an upper level cache, a cache memory system with a hybrid RAM structural design can reduce a capacity for storing data of a cache line, compared with a current level cache with a pure Inclusive Tag RAM structural design. In addition, because data of a cache line corresponding to an index address stored in the Inclusive Tag RAM is stored in both the current level cache and the upper level cache, when it is required to access the data of the cache line corresponding to the index address stored in the Inclusive Tag RAM of the current level cache, the data can be obtained from either the current level cache or the upper level cache. Compared with a current level cache with a pure Exclusive Tag RAM structural design, the cache memory system with the hybrid RAM structural design can improve a hit rate of obtaining data of a cache line and reduce a delay caused by reading data of a cache line from a main memory, thereby improving performance of the cache memory system.

It should be noted that in the present disclosure, the upper level cache is a level N cache, and the current level cache is a level N+1 cache, where N is a natural number. In the present disclosure, specific levels of the upper level cache and the current level cache are not limited, provided that the upper level cache and the current level cache are adjacent levels of caches.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A cache memory system, comprising:
multiple upper level caches, wherein each upper level cache comprises multiple cache lines; and
a current level cache comprising an exclusive tag random access memory (Exclusive Tag RAM) and an inclusive tag random access memory (Inclusive Tag RAM), wherein the Exclusive Tag RAM is configured to preferentially store an index address of a first cache line that is in each upper level cache and whose status is unique dirty (UD), wherein the Inclusive Tag RAM is configured to store an index address of a second cache line that is in each upper level cache and whose status is unique clean (UC), shared clean (SC), or shared dirty (SD), and wherein data of the second cache line is backed up and stored in the current level cache.

2. The cache memory system according to claim 1, wherein the multiple upper level caches comprise a first cache and a second cache,
wherein the current level cache comprises a data random access memory (Data RAM),
wherein the data of the second cache line is backed up and stored in the Data RAM,
wherein the first cache is configured to send a request for accessing a third cache line to the current level cache, and
wherein the current level cache is configured to:
determine that an index address of the third cache line is in the Exclusive Tag RAM or the Inclusive Tag RAM after receiving the request for accessing the third cache line sent by the first cache;
determine a status of the third cache line; and
determine to send, to the first cache according to the status of the third cache line, data that is of the third cache line and that is obtained from the second cache or data that is of the third cache line and that is backed up and stored in the Data RAM of the current level cache.

3. The cache memory system according to claim 2, wherein the current level cache is further configured to:

send the data that is of the third cache line and that is obtained from the second cache to the first cache when determining that the status of the third cache line is UD;
send the data that is of the third cache line and that is backed up and stored in the Data RAM of the current level cache to the first cache when determining that the status of the third cache line is SC or SD;
send a request for accessing the data of the third cache line to the second cache when determining that the status of the third cache line is UC;
send the data that is of the third cache line and that is obtained from the second cache to the first cache when the data of the third cache line sent by the second cache is received; or
send the data that is of the third cache line and that is backed up and stored in the Data RAM of the current level cache to the first cache when an indication, sent by the second cache, for skipping sending the data of the third cache line is received.

4. The cache memory system according to claim 2, wherein the current level cache further comprises a status random access memory (Status RAM), wherein the Status RAM is configured to record a status of a cache line whose index address is in the Exclusive Tag RAM or the Inclusive Tag RAM, and wherein the current level cache is configured to determine the status of the third cache line according to the Status RAM.

5. The cache memory system according to claim 1, wherein when a size of space, in the Exclusive Tag RAM, occupied by the index address of the first cache line reaches a maximum capacity value of the Exclusive Tag RAM, the Inclusive Tag RAM is further configured to store an index address of a fourth cache line that is in each upper level cache and whose status is UD, wherein the index address of the fourth cache line cannot be stored in the Exclusive Tag RAM, and wherein data of the fourth cache line is backed up and stored in the current level cache.

6. The cache memory system according to claim 1, wherein the UC state is used to indicate that a cache line in the UC state exists only in one cache of the cache memory system, and the cache line in the UC state comprises clean data,
wherein the UD state is used to indicate that a cache line in the UD state exists only in one cache of the cache memory system, and the cache line in the UD state comprises dirty data,
wherein the SC state is used to indicate that a cache line in the SC state exists in multiple caches of the cache memory system, and the cache line in the SC state comprises clean data, and
wherein the SD state is used to indicate that a cache line in the SD state exists in multiple caches of the cache memory system, and the cache line in the SD state comprises dirty data.

7. The cache memory system according to claim 1, wherein the upper level cache is a level N cache, wherein the current level cache is a level N+1 cache, and wherein N is a natural number.

8. A method for accessing a cache line in a cache memory system, wherein the cache memory system comprises multiple upper level caches and a current level cache, wherein each upper level cache comprises multiple cache lines, wherein the multiple upper level caches comprise a first cache and a second cache, wherein the current level cache comprises an exclusive tag random access memory (Exclusive Tag RAM) and an inclusive tag random access memory (Inclusive Tag RAM), wherein the Exclusive Tag RAM is configured to preferentially store an index address of a first cache line that is in each upper level cache and whose status is unique dirty (UD), wherein the Inclusive Tag RAM is configured to store an index address of a second cache line that is in each upper level cache and whose status is unique clean (UC), shared clean (SC), or shared dirty (SD), wherein data of the second cache line is backed up and stored in the current level cache, and wherein the method comprises:

sending, by the first cache, a request for accessing a third cache line to the current level cache;

determining, by the current level cache, that an index address of the third cache line is in the Exclusive Tag RAM or the Inclusive Tag RAM after receiving the request for accessing the third cache line;

determining, by the current level cache, a status of the third cache line; and determining, by the current level cache according to the status of the third cache line, to send, to the first cache, data that is of the third cache line and that is obtained from the second cache or data that is of the third cache line and that is backed up and stored in the current level cache.

9. The method according to claim 8, wherein determining, by the current level cache according to the status of the third cache line, to send, to the first cache, data that is of the third cache line and that is obtained from the second cache or data that is of the third cache line and that is backed up and stored in the current level cache comprises:

sending, by the current level cache, the data that is of the third cache line and that is obtained from the second cache to the first cache when determining that the status of the third cache line is UD;

sending, by the current level cache, the data that is of the third cache line and that is backed up and stored in the current level cache to the first cache when determining that the status of the third cache line is SC or SD;

sending, by the current level cache, a request for accessing the data of the third cache line to the second cache when determining that the status of the third cache line is UC;

sending, by the current level cache, the data that is of the third cache line and that is obtained from the second cache to the first cache when the data of the third cache line sent by the second cache is received; or sending, by the current level cache, the data that is of the third cache line and that is backed up and stored in the current level cache to the first cache when an indication, sent by the second cache, for skipping sending the data of the third cache line is received.

10. The method according to claim 9, wherein sending, by the current level cache, the data that is of the third cache line and that is obtained from the second cache to the first cache when determining that the status of the third cache line is UD comprises:

sending, by the current level cache, a request for accessing the data of the third cache line to the second cache;

sending, by the second cache, the data of the third cache line stored in the second cache to the current level cache after receiving the request for accessing the data of the third cache line; and sending, by the current level cache, the received data of the third cache line to the first cache.

11. The method according to claim 8, wherein determining, by the current level cache, the status of the third cache line comprises determining, by the current level cache, the status of the third cache line according to a status random access memory (Status RAM) of the current level cache, and wherein the Status RAM is configured to record a status of a cache line whose index address is in the Exclusive Tag RAM or the Inclusive Tag RAM.

12. The method according to claim 8, further comprising:

establishing, in the Inclusive Tag RAM, an index address that is of the first cache line and that is in the current level cache when the status of the first cache line whose index address is in the Exclusive Tag RAM changes from UD to SC, SD, or UC, backing up and storing data that is of the first cache line and that resides in one cache of the multiple upper level caches into the current level cache, and deleting the index address that is of the first cache line and that is in the Exclusive Tag RAM; and establishing, in the Exclusive Tag RAM, an index address of the second cache line in the upper level cache when the status of the second cache line whose index address is in the Inclusive Tag RAM changes from SC, SD, or UC to UD, and deleting the data that is of the second cache line and that is backed up and stored in the current level cache and the index address that is of the second cache line and that is in the Inclusive Tag RAM.

13. The method according to claim 8, wherein the UC state is used to indicate that a cache line in the UC state exists only in one cache of the cache memory system, and the cache line in the UC state comprises clean data, wherein the UD state is used to indicate that a cache line in the UD state exists only in one cache of the cache memory system, and the cache line in the UD state comprises dirty data, wherein the SC state is used to indicate that a cache line in the SC state exists in multiple caches of the cache memory system, and the cache line in the SC state comprises clean data, and wherein the SD state is used to indicate that a cache line in the SD state exists in multiple caches of the cache memory system, and the cache line in the SD state comprises dirty data.

14. The method according to claim 8, wherein the upper level cache is a level N cache, wherein the current level cache is a level N+1 cache, and wherein N is a natural number.

\* \* \* \* \*

UNITED STATES PATENT AND TRADEMARK OFFICE
CERTIFICATE OF CORRECTION

PATENT NO.       : 10,114,749 B2
APPLICATION NO.  : 15/606428
DATED            : October 30, 2018
INVENTOR(S)      : Zhenxi Tu and Jing Xia It is certified that error appears in the above-identified patent and that said Letters Patent is hereby corrected as shown below:

On the Title Page

Item (30), Line 1: "20141070599" should read "201410705991.3"

Signed and Sealed this
Fourth Day of December, 2018

Andrei Iancu
*Director of the United States Patent and Trademark Office*